Oct. 16, 1923.

C. V. MORSE

PUMP

Filed May 20, 1922

Inventor:
Clyde V. Morse,
by
His Attorneys.

Patented Oct. 16, 1923.

1,470,863

UNITED STATES PATENT OFFICE.

CLYDE V. MORSE, OF GALESBURG, ILLINOIS.

PUMP.

Application filed May 20, 1922. Serial No. 562,332.

*To all whom it may concern:*

Be it known that I, CLYDE V. MORSE, a citizen of the United States, residing at Galesburg, Knox County, Illinois, have invented a new and useful Pump, of which the following is a specification.

This invention relates to improvements in pumps, and consists in the novel construction hereinafter disclosed.

An object of the invention is to provide a pump, the ports of which are controlled exclusively by the walls of the piston so as to avoid the use of valves, which pump will be efficient and easy of operation.

Figure 1:
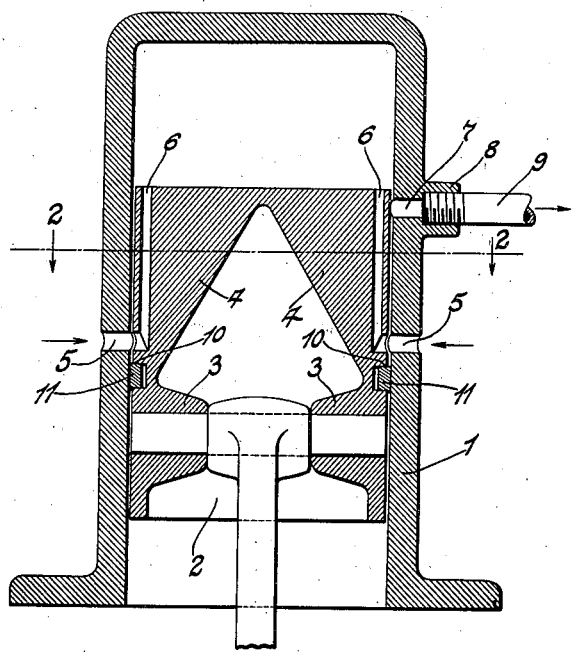

Additional advantages of the construction will be apparent from the following detailed description taken in connection with the accompanying drawing, in which Fig. 1 is a vertical section through the pump.

Figure 2:
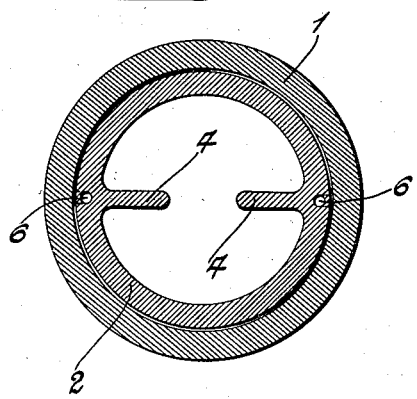

Fig. 2 is a cross section thereof, taken substantially on the line 2—2 of Fig. 1.

In the embodiment of the invention illustrated in the drawing the pump is shown as including a cylinder 1 in which is mounted a piston 2, said piston being provided with wrist pin bosses 3 and radial ribs 4 which extend from the upper part of the bosses 3 to the head of the piston.

The cylinder is provided with inlet ports 5 extending through the wall thereof and opening to atmosphere. Said ports 5 register with L-shaped passages 6 that extend through the head of the piston downwardly and branch radially to the periphery of the piston.

In the position of the piston shown in Fig. 1 air from atmosphere is admitted through the ports 5 and passages 6 to the compression chamber between the head of the piston and the head of the cylinder. Through the wall of the cylinder is an exhaust port 7 that extends into a threaded boss 8 upon the wall of the cylinder into which is connected a service pipe 9. The port 7 is above the ports 5 a distance equal to the stroke of the piston so that when the piston is at the end of its up-stroke the radial branch of one of the L-shaped passages 6 will register with the port 7.

The piston is provided with a piston ring groove 10 below the lower extremity of the passages 6 in which groove is mounted a piston ring 11, the piston ring serving to maintain compression during the operation of the cylinder piston.

Obviously, as the piston moves upwardly from the position shown in Fig. 1 the inlet ports will be closed and the volume of air or gas accumulated in the head of the cylinder will be compressed, and when the radial branch of one of the passages 6 registers with the exhaust port 7 the compressed volume of air or gas will be forced into the service pipe 9. It will be also understood that the service pipe 9 may be provided with the usual form of back pressure valve, so as to prevent any back pressure in the service pipes.

The fins or ribs 4 extending radially inwardly to the piston body provide means for cooling the pump structure so that the pump may be operated without additional cooling means in the form of a water jacket or otherwise.

I am aware that the invention may be modified in numerous particulars without departing from the spirit and scope thereof. I do not limit myself, therefore, to exact details of construction and arrangement shown and described, but what I claim and desire to secure by Letters Patent is:—

1. A pump, comprising a cylinder, a reciprocating piston mounted in the cylinder, inlet ports through the wall of the cylinder, an L-shaped passage in the piston extending from the head of the piston downwardly and radially to the periphery of the piston, and an exhaust port spaced from the inlet ports so that the passage in the piston will register with the exhaust port at the end of the up-stroke of the piston.

2. A pump, comprising a cylinder, inlet ports through the wall of the cylinder, a piston mounted to reciprocate in the cylinder, L-shaped passages in the piston extending from the head thereof to the periphery of the piston at a point substantially intermediate of the top and bottom of the piston, and an exhaust port located above said inlet ports and arranged to register at the end of the up-stroke of the piston with one of said passages in the piston.

3. A pump, comprising a cylinder, a reciprocating piston mounted in the cylinder, inlet ports through the wall of the cylinder, an L-shaped passage in the piston extending from the head of the piston downwardly and radially to the periphery of the piston, an exhaust port spaced from the inlet ports so that the passage in the piston will register with the exhaust port at the end of the upstroke of the piston, a piston ring groove in the piston below the passage in the piston, and a piston ring carried in said groove.

4. A pump, comprising a cylinder, a reciprocating piston mounted in the cylinder, inlet ports through the wall of the cylinder, an L-shaped passage in the piston extending from the head of the piston downwardly and radially to the periphery of the piston, an exhaust port spaced from the inlet ports so that the passage in the piston will register with the exhaust port at the end of the upstroke of the piston, and inwardly extending radial ribs within the body of the piston.

5. A pump, comprising a cylinder, a reciprocating piston mounted in the cylinder, inlet ports through the wall of the cylinder, an L-shaped passage in the piston extending from the head of the piston downwardly and radially to the periphery of the piston, an exhaust port spaced from the inlet ports so that the passage in the piston will register with the exhaust port at the end of the upstroke of the piston, inwardly extending radial ribs within the body of the piston, a piston ring groove in the piston below the passage in the piston, and a piston ring carried in said groove.

CLYDE V. MORSE.